United States Patent [19]

Bos et al.

[11] Patent Number: 4,600,155
[45] Date of Patent: Jul. 15, 1986

[54] MACHINE FOR PROCESSING FOODSTUFFS AND OTHER PRODUCTS, PARTICULARLY FOR CHOPPING AND MIXING THE SAME

[75] Inventors: Pierre H. Bos; Joël R. Musseau; Jean-Pierre Richard, all of Aubusson, France

[73] Assignee: Dito Sama, Aubusson, France

[21] Appl. No.: 671,565

[22] Filed: Nov. 15, 1984

Related U.S. Application Data

[63] Continuation of Ser. No. 427,933, Sep. 29, 1982, abandoned.

[30] Foreign Application Priority Data

Oct. 2, 1981 [FR] France .................................. 81 18607

[51] Int. Cl.⁴ ............................................. B02C 18/18
[52] U.S. Cl. .................................. 241/37.5; 241/166; 241/282.1
[58] Field of Search ................ 241/166, 167, 36, 37.5, 241/92, 282.1, 282.2, 285 R

[56] References Cited

U.S. PATENT DOCUMENTS

| 3,313,332 | 4/1967 | Stephan et al. | 241/166 X |
| 4,113,188 | 9/1978 | Belinkoff | 241/37.5 |
| 4,184,641 | 1/1980 | Coggiola | 241/37.5 |
| 4,226,373 | 10/1980 | Williams | 241/37.5 |
| 4,373,677 | 2/1983 | Kunihiro | 241/37.5 |

Primary Examiner—Mark Rosenbaum
Attorney, Agent, or Firm—Hauke and Patalidis

[57] ABSTRACT

A machine for processing foodstuffs comprising a tank whose position on a support base is determined by a finger projecting from the tank and engaged in a socket in the support base. The support base is part of a housing in which is disposed a drive motor driving a shaft vertically projecting in the tank and supporting appropriate cutters. The tank is covered by a removable cover, and interlocks are provided for preventing the drive motor from being started unless the tank is correctly positioned, the removable cover is locked over the tank and appropriately positioned relative to the tank.

13 Claims, 7 Drawing Figures

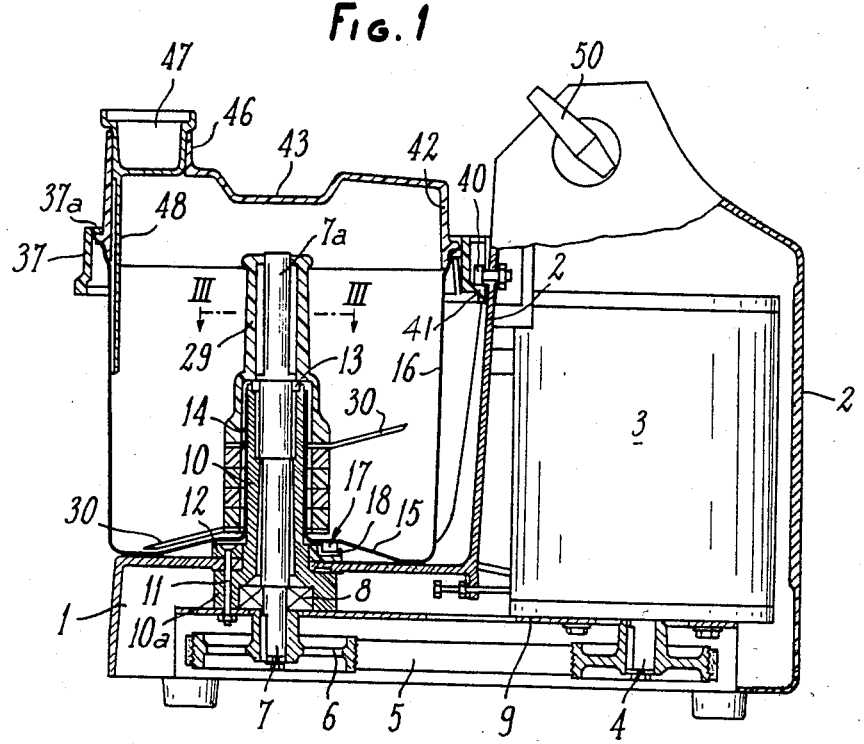
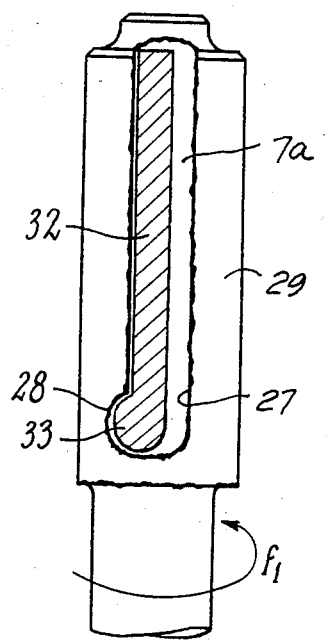
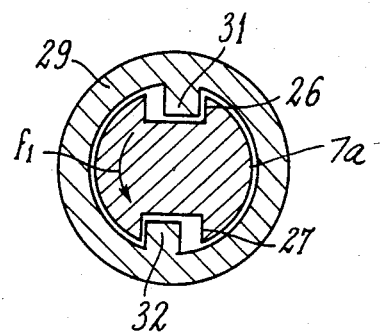

4,600,155

MACHINE FOR PROCESSING FOODSTUFFS AND OTHER PRODUCTS, PARTICULARLY FOR CHOPPING AND MIXING THE SAME

This is a continuation of application Ser. No. 427,933 filed Sept. 29, 1982 now abandoned.

FIELD OF THE INVENTION

The present invention relates to a new machine for processing foodstuffs, enabling particularly to chop raw or cooked foodstuffs, namely meats and vegetables, and to carry out mixings, crushings or dough kneadings, or also to make various preparations such as emulsions, as mayonnaises, etc. The invention also applies to other products and particularly to chemical preparations.

BACKGROUND OF THE INVENTION

The known art has already taught various processors of this kind particularly apparatus for the preparation of foods in communities, apparatus comprising a motor assembly for driving the rotating cutters which are arranged in a tank which can be disassembled in order to be washed.

OBJECTS AND SUMMARY OF THE INVENTION

The invention relates to improvements to apparatus of the type hereabove mentioned, which bring about a more easy utilization of these machines and making them also safer. Actually it is important that the user, even if little careful, cannot be hurt in any case by untimely starting the machine, particularly when assembling and disassembling the cutters, as well as placing in position and removing the working tank and the cover of the latter.

According to the invention, the food processing machine, particularly provided for chopping food products, comprises a motor assembly for driving the cutters which are removably arranged in a removable tank and is characterized in that the tank is provided with at least one finger cooperating with at least one stopping element, said tank being closed by a removable cover.

Various other features of the invention will become more apparent from the following detailed description.

BRIEF DESCRIPTION OF THE DRAWINGS

An embodiment of the invention is shown, by way of a non limiting example, in the accompanying drawings, wherein:

FIG. 1 is a diagrammatic elevation cross-sectional view of the food processing machine which is the object of the invention;

FIG. 2 is an elevation view illustrating a particular feature concerning two of the parts shown in FIG. 1;

FIG. 3 is an enlarged cross-sectional view taken along line III—III of FIG. 1;

DETAILED DESCRIPTION OF THE INVENTION

Figure 4:
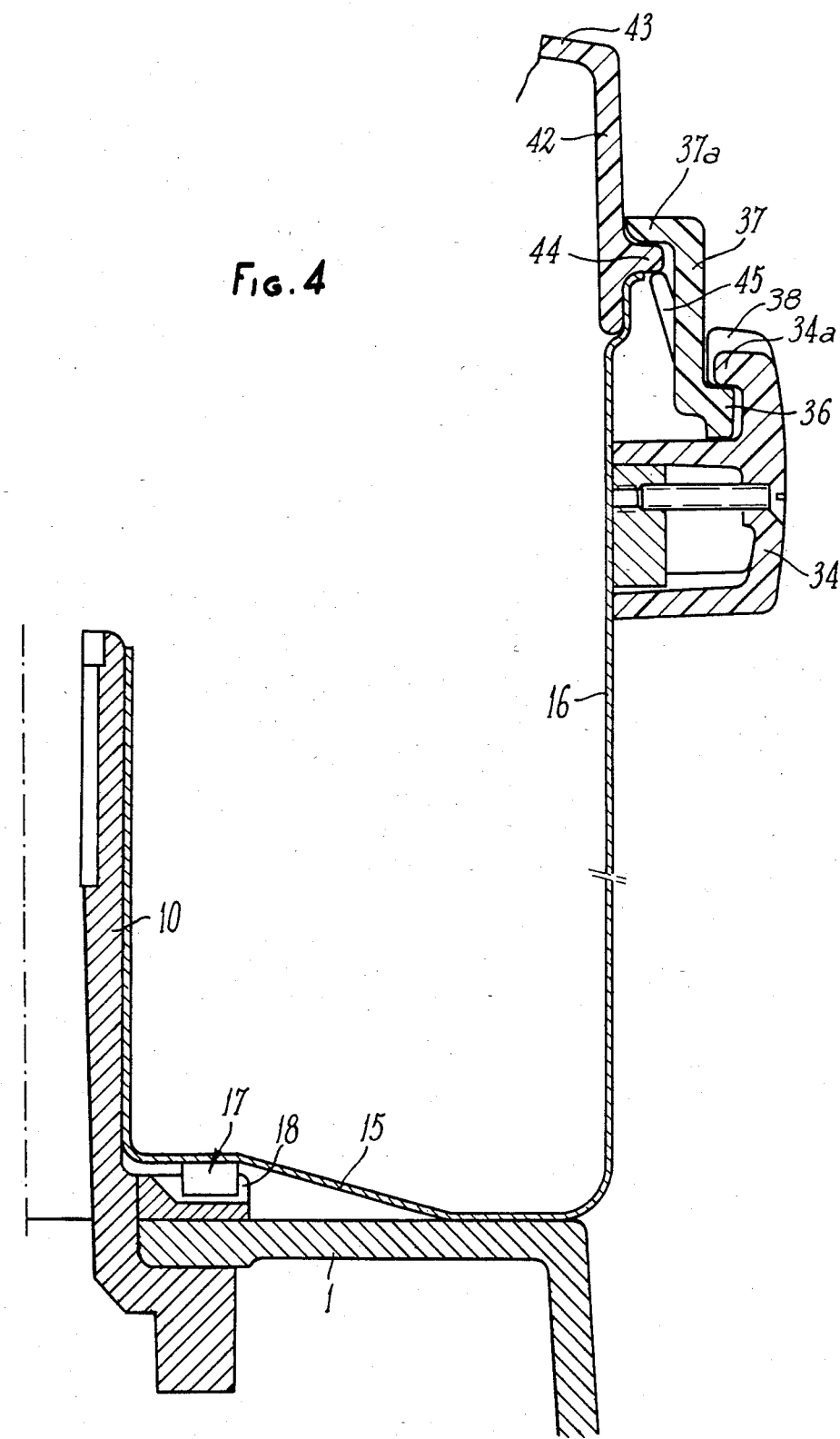
FIG. 4 is a partial cross-sectional half elevation view illustrating a detail of realization.

The machine shown in the drawings comprises a stand 1 forming, on one side, a casing 2 containing a motor assembly 3 the output shaft 4 of which drives, for example by means of a belt 5 and a pulley 6, a driven shaft 7 journalled in bearings 8. The bearings 8 are supported on a platen 9 on which is fixed a base 10a of a socket 10. The fixation of the base 10a is provided for example by means of screws 11 serving also as fixation of a plate 12 the function of which is discussed herebelow.

The driven shaft 7 is guided inside socket 10 and protrudes at 7a above this socket. A sealing ring 13 is provided at the upper part of the socket 10 and surrounds the shaft 7.

The outer wall of the socket 10 is cylindrical or slightly tapering, in order to be inserted with a slight fit, inside a tubular member or well 14 formed from the bottom 15 of a tank 16.

The drawings show that the tank 16 is advantageously made of a relatively thin walled metal, for example in stainless steel.

The bottom of the tank 15 is preferably slightly tapering as shown, and comprises underneath a finger 17 fitting into a notch 18 of the plate 12. In this way, the tank is prevented from being rotated relative to the stand 1 and can only occupy a single position.

Figure 6:
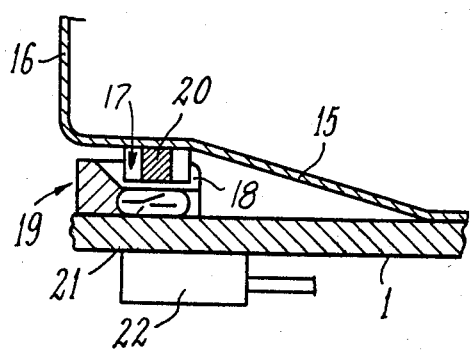
FIG. 6 is an enlarged partial cross-sectional view of a detail shown in FIG. 1.

While not necessary in all cases, it is advantageous, as shown in FIG. 6, to provide a detecting mechanism 19, also called presence detector, between the stand 1 and tank 16. This presence detector can be made in many ways known in the art.

In FIG. 6, the presence detector comprises a magnet 20 and a switch 21, for example a so-called "reed switch", controlling a relay 22 when the tank 16 is not in a correct position.

Figure 7:
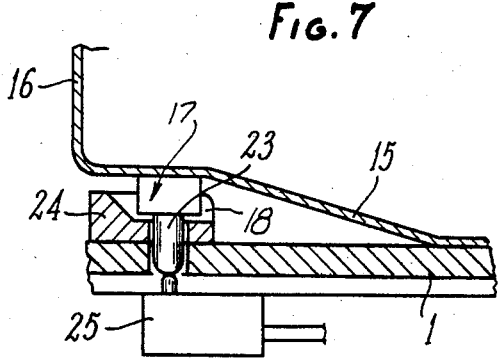
FIG. 7 is a cross-sectional elevation view similar to FIG. 6, illustrating an alternative embodiment.

In FIG. 7, the presence detector comprises a push-piece 23 extending through a marking hole 24 and operating a mechanical relay 25 when the tank 16 is in a suitable position.

It is advantageous to provide the presence detector such that when in a working position, it has a circuit which is normally closed so that information transmitted by the circuit is necessarily an information of good operation and that information corresponding to a wrong position of the tank is similar to an information of wrong operation of the circuit.

Other types of presence detectors can be used, for example optic fiber detectors, photo-electric cell detectors, capacitive detectors, fluidic detectors, etc.

The protruding portion 7a of the shaft 7 has longitudinal grooves 26, 27 the lower portion of which is formed with a widening 28 extending in a direction opposite to that of the rotation direction shown by arrow $f_1$ (FIGS. 2 and 3).

The portion 7a of the shaft 7 is fitted into a sheath or sleeve 29 (FIGS. 1 and 3) carrying cutters 30. The cutters 30 are advantageously slightly folded, as shown in FIG. 1, and moreover they can be curved in order to form a pitch, the pitch of two consecutive cutters being advantageously opposite. The cutters can be replaced by other tools, for example mixing blades.

The upper portion of the sheath 29 which corresponds to the protruding portion 7a of the shaft 7 carries inner small bars 31, 32 formed, as shown in FIG. 2, with a boss 33 provided for being inserted into the corresponding widening 28. The width of each boss 33 is however slightly less than the width of the longitudinal grooves 26, 27 in order that the bosses can slide within the grooves.

As appears from the foregoing, when the shaft 7 is driven in the direction of arrow $f_1$, its movement is transmitted to the sheath 29 by the small bars 31, 32. Since the cutters carried by the sheath 29 are necessarily braked in their movement in which they are driven, the result is that the bosses 33 are kept in the bottom of the widenings 28, thereby preventing upper movements of the cutters while rotating.

The tank 16 is provided with side handles 34, 35 (FIGS. 4 and 5) to be used for putting it in position and removing it; moreover, the handles 34 and 35 comprise turned-down segments 34a and 35a provided for cooperating with a peripheral edge 36 of a ring 37. The edge 36 is formed with cut-out portions 38 having a width slightly superior to that of the segments 34a, 35a in order to bring the edge 36 below the segments 34a, 35a. The edge 36 is formed with a third cut-out portion 39, FIG. 5, for the passage of a finger 40 carried by the casing 2 and provided for cooperating with an abutment 41 of the ring 37, FIGS. 1 and 5.

The ring 37 fitted onto the turned-down edge 42 of a cover 43. The turned-down edge 42 forms a peripherical flange 44 for an edge 37a of the ring 37.

The flange 44 and the edge 37a have a configuration such as to present together a small friction so that the cover 42 can be easily turned relative to the ring 37. In order to prevent the ring 37 from being displaced vertically with respect to the cover and separated from it, the ring 37 is provided with retaining elements 45. The retaining elements 45 can be constructed in many different ways, for example as shown in FIG. 4, by deformable lugs providing a snap-in connection between the ring and cover by a temporarily deformation of the lugs. The members 45 could also be formed by fingers extending through the ring 37 and protruding below the flange 44. Other means known in the art for producing the same effect can also be used.

It is advantageous that the cover be fabricated from a molded material and preferably a transparent material in order to permit the user to control the work inside the tank 16.

Figure 5:
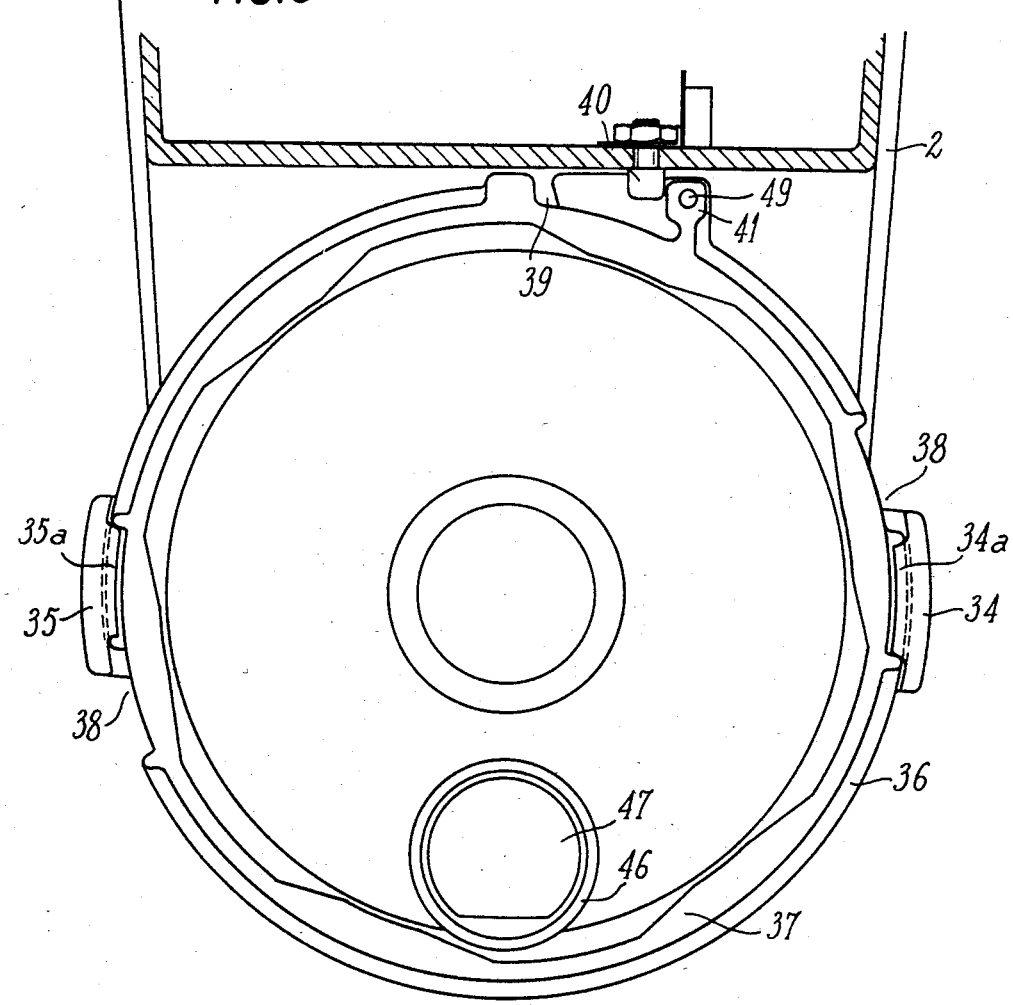
FIG. 5 is a partial top view.

FIGS. 1 and 5 show that the cover 43 has a configuration such as to define a tubular base 46 which is formed in the immediate vicinity of its turned-down edge 42. The tubular base 46 is used for placing a plug 47 from the bottom of which protrudes a scraper blade 48. The scraper blade 48 extends downwardly at least down to the level of the highest cutter 30.

Further to the foregoing, the ring 37 comprises, for example at the level of the abutment 41, a position detector 49, FIG. 5, which can be made in many different ways and for example as hereabove described with reference to the presence detector 19. The position detector 49 as well as the presence detector 19 are arranged such that their circuits are in series, so that faulty positions of the tank and any faulty position of the ring 37, relative to the tank, prevent operation of the motor assembly 3; one is thus sure that the tank is always well positioned and that the cover is also in place when the cutters are driven.

The motor and reduction gear assembly 3 is controlled from a switch 50, FIG. 1, having several positions so that the driving of the cutters be progressive as well as their slowing down. This can be performed in many ways shown in the art, for example by displacing the switch 50 so as to bring it successively in positions for which the speed of the output shaft 4 is different or according to an arrangement where it controls a potentiometer or a thyristor.

The position and presence detectors hereabove described prevent the operation of switch 50 to have an effect of some sort if the tank is not in a right position or when the cover is not itself in position and the ring retaining it does not occupy a determined position. Thus, there is no risk for an operator to withdraw the sheath 29 carrying the cutters, then to remove the tank for cleaning it.

Likewise, no accident can occur when positioning the sheath carrying the cutters or during processing the foodstuffs in the tank, for example when chopping meats or vegetables. Should the foodstuffs have a tendency to agglomerate on the inner wall of the tank, the only thing to do for the operator is to turn the cover by using base 46 as a handle so that the scraper blade 48 removes the products adhering to the inner wall of the tank.

The invention is not limited to the embodiment shown and described in detail and various modifications can be carried out without departing from its scope as shown in the appendant claims. In particular, the motor assembly 3 can be disposed directly below the tank 16. Similarly, several sets of cutters can be provided according to the nature of the work to be performed. Moreover, the plug 47 can be used for the introduction of various ingredients while the food processing machine is operating.

What is claimed is:

1. A processing machine for chopping and mixing foodstuffs and other products, said processing machine comprising a casing, a base extending laterally from said casing, a driving motor assembly disposed in said casing, a driven shaft driven by said motor assembly and extending vertically through said base, a substantially cylindrical open-top tank having a bottom wall and a tubular member extending upwardly in the interior of said tank such that said driven shaft is disposed within said tubular member when said tank is placed on said base with an upper portion of said driven shaft projecting from said tubular member, a sleeve disposed around said tubular member, coupling means between said sleeve and said projecting portion of said driven shaft for driving said sleeve by said driven shaft, cutters attached to said sleeve, a finger projecting from the bottom of said tank, a stop member in the form of a socket disposed in said base for engagement by said finger for providing a predetermined position of the tank relative to said base, a removable cover disposed over said tank for closing said tank, a locking ring interconnecting said cover and said tank, said locking means being arranged to provide said cover with limited freedom for rotating relative to said tank, abutment means associated with said casing and co-operating with said locking means for preventing separation of said tank from said base when said tank is in an operative position, and a position detector associated with said abutment means for preventing activation of the motor assembly unless said cover and said tank are in an operative position.

2. The processing machine of claim 1 further comprising a presence detector co-operating with said finger projecting from the bottom of said tank and with said socket in said base for preventing activation of the motor assembly unless said tank is in a working position relative to said base.

3. The processing machine of claim 2 further comprising an opening in said cover, and at least one scraper blade extending within said tank along a wall thereof, said scraper blade being attached to a plug disposed in said opening.

4. The processing machine of claim 3 wherein said coupling means between said sleeve and said projecting portion of said driven shaft comprises at least one longitudinal groove on said driven shaft projecting portion, and a corresponding elongate integral portion projecting from said sleeve into said groove, said projecting portion having an enlarged portion fitting in a widened portion of said groove and preventing separation of said sleeve from said driven shaft upon rotation of said shaft.

5. The processing machine of claim 2 wherein said coupling means between said sleeve and said projecting portion of said driven shaft comprises at least one longitudinal groove on said driven shaft projecting portion, and a corresponding elongate integral portion projecting from said sleeve into said groove, said projecting portion having an enlarged portion fitting in a widened portion of said groove and preventing separation of said sleeve from said driven shaft upon rotation of said shaft.

6. The processing machine of claim 2 wherein said presence detector and said position detector are switches placed in series in a circuit controlling the operation of the motor assembly.

7. The processing machine of claim 6 further comprising an opening in said cover, and at least one scraper blade extending within said tank along a wall thereof, said scraper blade being attached to a plug disposed in said opening.

8. The processing machine of claim 7 wherein said coupling means between said sleeve and said projecting portion of said driven shaft comprises at least one longitudinal groove on said driven shaft projecting portion, and a corresponding elongate integral portion projecting from said sleeve into said groove, said projecting portion having an enlarged portion fitting in a widened portion of said groove and preventing separation of said sleeve from said driven shaft upon rotation of said shaft.

9. The processing machine of claim 6 wherein said coupling means between said sleeve and said projecting portion of said driven shaft comprises at least one longitudinal groove on said driven shaft projecting portion, and a corresponding elongate integral portion projecting from said sleeve into said groove, said projecting portion having an enlarged portion fitting in a widened portion of said groove and preventing separation of said sleeve from said driven shaft upon rotation of said shaft.

10. The processing machine of claim 1 further comprising an opening in said cover, and at least one scraper blade extending within said tank along a wall thereof, said scraper blade being attached to a plug disposed in said opening.

11. The processing machine of claim 10 wherein said coupling means between said sleeve and said projecting portion of said driven shaft comprises at least one longitudinal groove on said driven shaft projecting portion, and a corresponding elongate integral portion projecting from said sleeve into said groove, said projecting portion having an enlarged portion fitting in a widened portion of said groove and preventing separation of said sleeve from said driven shaft upon rotation of said shaft.

12. The processing machine of claim 1 wherein said coupling means between said sleeve and said projecting portion of said driven shaft comprises at least one longitudinal groove on said driven shaft projecting portion, and a corresponding elongate integral portion projecting from said sleeve into said groove, said projecting portion having an enlarged portion fitting in a widened portion of said groove and preventing separation of said sleeve from said driven shaft upon rotation of said shaft.

13. The processing machine of claim 1 wherein said motor assembly is controlled by an on-off switch and further comprising means for adjustably varying the speed of said motor assembly.

* * * * *